April 18, 1944.　　　　C. D. OLSON　　　　2,346,937

VENT STRUCTURE FOR CELLS EMPLOYING A LIQUID ELECTROLYTE

Filed Aug. 19, 1942

INVENTOR
CLAIR DELMER OLSON
BY Edward J Dwyer
ATTORNEY

Patented Apr. 18, 1944

2,346,937

UNITED STATES PATENT OFFICE 2,346,937

VENT STRUCTURE FOR CELLS EMPLOYING LIQUID ELECTROLYTES

Clair Delmer Olson, Flagstaff, Ariz., assignor to The Electric Storage Battery Co., a corporation of New Jersey Application August 19, 1942, Serial No. 455,318

10 Claims. (Cl. 136—177)

This invention relates to new and improved means for controlling the electrolyte level in cells employing a liquid electrolyte and more particularly to improved means for preventing the overfilling of storage batteries.

It is a primary object of this invention to provide a new and improved device of this character which is simple in construction, effective in operation, has no moving parts and may be manufactured at relatively low cost.

It is a specific object of this invention to provide a new and improved filling device for storage batteries which requires no mechanical valve members yet is automatic and positive in its operation to indicate that the cell of a battery has been filled to its proper level.

A further specific object of this invention is to provide a device of this character which does not impede the taking of specific gravity readings of the storage battery cell and which retards the entrainment of electrolyte in the gases given off by the cell during use of the battery thereby avoiding "spitting" of electrolyte through the vent plug.

Further objects and advantages of this invention will appear as the following description proceeds and the features of novelty which characterize this invention will be set forth in the claims appended to and forming a part of this specification.

In accordance with this invention a non-overfilling device for cells employing a liquid electrolyte is provided which essentially comprises a filling well and an auxiliary gas vent tube both of which are free of the special valves and the like provided in the normal non-overfilling device. The filling well projects through the cell cover and the gas vent tube lies adjacent the filling well so that its upper end is normally closed by the usual vent plug used for closing the filling tube. The lower end of the vent tube determines the desired level of the electrolyte in the cell. The lower end of the filling well on the other hand is provided with means defining a restricted opening and formed in the side wall of the filling well is a fluid passageway of substantial area forming the primary path for the flow of fluid into the cell. The passageway is so constructed that the liquid flowing therethrough forms a positive liquid seal which performs a valve action to prevent the escape of gases trapped under the cover.

In the operation of this improved device, the liquid being added to the cell will flow into the cell through the passageway provided in the side wall of the filling well, until the liquid in the cell rises to cover the lower end of the gas vent tube. When this occurs further escape of gas is prevented and the pressure in the gas space beneath the cover rises so as to impede further flow through the passageway and liquid will rise in the filling well to indicate the cell has been filled to the desired level.

For more complete understanding of this invention reference should be had to the accompanying drawing in which.

Figure 1:
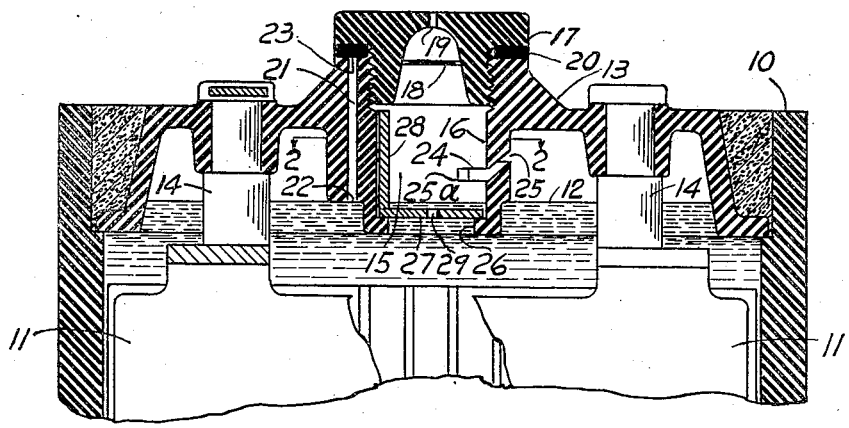
Figure 1 is a partial sectional view of the upper part of a cell of a storage battery showing the improved filling device of this invention.

Referring to the drawing and particularly Figure 1, 10 represents the container of a storage battery in which are located groups of positive and negative plates 11 immersed in a quantity of electrolyte 12. Covering the container is a hard rubber cover member 13 through which project terminal posts 14. Provided in the cover is a filling well 15 having side walls 16 which project below the under surface of the cover. This filling well is internally threaded at its upper end so as to receive the threaded vent plug 17 which is provided with a baffle 18 and vent opening 19. A gasket 20 is provided so as to insure a liquid tight seal between the cover and cap. The construction described thus far represents the standard construction used in a storage battery, the vent in the cap for the filling well being provided to permit the escape of gases formed during operation of the cell.

Provided in one wall of the filling well is an auxiliary gas vent tube or passageway 21 the position of the lower end 22 of which determines the desired level of the electrolyte in the cell. The opposite end of the vent passageway terminates in the boss 23 provided at the top of the filling well. This upper end of the auxiliary vent is normally open and is closed when the vent plug is screwed into the filling well to the position shown in Figure 1.

Figure 2:
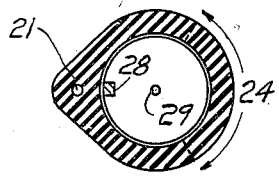
Figure 2 is a sectional view taken on the line 2—2 of Figure 1.

Provided in the side wall of the filling well opposite the auxiliary vent tube 21 is an opening or slot 24 which is cut at an angle so that the portion 25 of the slot on the outer wall of the filling well is higher than the portion 25a of the slot in the inner wall of the filling well. As shown in Figure 2, the slot 24 extends for a substantial distance around the wall 16 of the filling well so that an opening is provided having a substantial area. The function of this opening will be more fully described hereinafter but in general it forms a passageway for the flow of the fluid into the battery cell.

The lowermost portion of the filling well is provided with a circumferential projection which forms a ledge 26. Resting on this ledge is a disc or orifice plate 27 made of lead or some suitable heavy, acid resisting material. Projecting upwardly from the disc 27 is a rod 28 which is utilized for inserting and removing the disc. Centrally located in the disc is an opening 29 having a relatively small area. In the preferred form of this invention the opening is of such size that approximately 15 seconds time is required to drain the filling well from the top of the filling well to the lower edge of the slot 24. Flow through the end of the filling well is thereby greatly restricted. The disc 27 is removable so that a hydrometer tube or other measuring instruments may be readily inserted into the cell for taking specific gravity readings.

In the operation of my improved filling device as described thus far it will be assumed that it is desired to add liquid to the cell. Under these circumstances, the vent plug 17 will be removed so that the upper end of the auxiliary vent tube 21 will be uncovered. Liquid will then be supplied through the main opening in the filling well and, due to the restriction of flow of the liquid through the orifice 29, it will rise in the filling well to opening 25a and flow through the passageway 24 into the space below the cover of the cell. Since the passageway is biased upwardly, a liquid seal will be formed by the fluid so that no gas can escape from under the cover at this point. Instead the gas must escape through the auxiliary vent tube 21. Therefore, when the liquid rises within the cell until it covers the lower end 22 of the auxiliary vent, the gas under the cover can no longer escape and the pressure will rise so that the flow through the passageway 24 is impeded. This will cause the liquid to rise in the filling well above the inlet 25a of the passageway 24, thus giving the operator an indication that the cell has been filled to its proper level. The filling operation will then be terminated and the surplus liquid which has accumulated in the filling well will slowly drain through the opening 29 in the disc 27 into the cell due to the difference in head between the liquid in the filling well and that outside of the well. Eventually the liquid level will equalize at about the level of the lower end 22 of the auxiliary vent 21 causing the passageway 24 to be drained of liquid. Upon completion of the filling operation the vent plug 17 is screwed into place whereby the auxiliary vent 21 is closed. However, gases collecting in the cell are vented through the passageway 24 into the filling well and out through vent opening 19 in the vent plug 17. In this connection it is to be noted that the gas in traveling this path must change directions several times. This tends to free the gas of any entrained electrolyte thereby substantially reducing "spitting" at the vent plug.

If it is desired to take a gravity reading of the electrolyte in the cell, the vent plug 17 will be unscrewed and the disc 27 removed by means of the rod 28. An unimpeded path is thereby provided to the interior of the cell. It is to be pointed out that in the preferred form of this invention the diameter of the auxiliary vent 21 is of sufficient size so as to prevent it from being easily clogged by any dirt or other foreign substances but of insufficient size to permit the insertion of the usual rubber tube for taking a sample of electrolyte.

Figure 3:
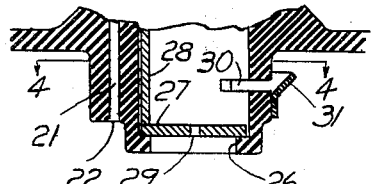
Figure 3 is a partial sectional view showing a modified form of the improved filling device of this invention.
Figure 4:
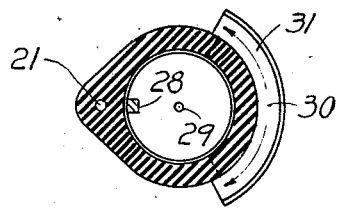
Figure 4 is a sectional view taken on the line 4—4 of Figure 3.

In Figures 3 and 4 there has been shown a modified form of this invention. The manner of operation of this form is identical with that already described. However, there is shown in these figures a construction which presents certain advantages so far as manufacturing operations are concerned. In particular, instead of making a passageway by providing a slot at an angle in the side wall of the filling well, a slot 30 straight through the filling well wall is provided, and vulcanized to the outer surface of the filling well adjacent the lower edge of this slot is a baffle member 31 which projects upwardly and outwardly as shown in Figure 3 so as to deflect the path of the liquid upwardly to form the liquid seal previously referred to.

From the foregoing detailed description it will be seen that a new and improved device is provided for preventing overfilling of electrolytic cells which device is simple in construction, reliable and positive in operation, and contains no moving parts or valve members liable to be rendered ineffective by an operator.

It is to be understood that while the improved device has been disclosed in its preferred form as an integral part of the cover, the elements could be assembled as a unit and added to the cover structure. In this way the improved device of this invention could be applied to batteries presently having no means for preventing overfilling.

While there has been shown particular embodiments of this invention, it will be understood of course that it is not desired to be limited thereto since modifications other than those already mentioned may be made and it is therefore contemplated by the appended claims to cover any such modifications as fall within the true spirit and scope of this invention.

I claim:

1. In a cell employing liquid electrolyte a device for preventing overfilling of said cell comprising a cover, a filling well in said cover having walls projecting downwardly into said cell defining an enlarged opening, means adjacent said opening for restricting the flow of liquid through said opening, an air vent in said cover adjacent said filling well having one end terminating below said cover at the desired electrolyte level and its opposite end terminating adjacent the outer surface of said cover, and a main filling opening in the wall of said filling well above said flow restricting means but below said cover, said filling opening being constructed and proportioned to fill with liquid during a filling operation so that liquid flowing therethrough will form a seal to prevent the escape of gas other than through said vent tube during the filling operation.

2. In a cell employing liquid electrolyte a device for preventing overfilling of said cell, comprising a tubular filling well adapted to be supported in the cover for said cell, a vent plug for closing the upper end of said filling well, means for restricting the flow through the lowermost end of said filling well, a gas vent tube adjacent said filling well having its lowermost end terminating at the desired electrolyte level and its uppermost end positioned so as to be closed by said vent plug when said plug is in its filling well closing position, and an elongated opening in the side wall of said filling well below said cover through which liquid is adapted to flow during a filling operation, said opening having an area substantially greater than the area of the opening in the lowermost portion of said filling well and having angularly disposed walls defining means for providing a positive liquid seal while liquid is flowing through said opening whereby during a filling operation liquid will overflow into said cell through said elongated opening until the liquid in said cell rises to the level of the lower end of said gas vent tube whereupon the flow through said elongated opening will be impeded by the increased gas pressure under said cover and liquid will rise in said filling well to indicate that the cell has been filled to its proper level.

3. In a cell employing liquid electrolyte a device for preventing overfilling of said cell comprising a cover, a filling well extending through said cover, means in the lower end of said filling well for restricting the flow of liquid into said cell, means for removing said last mentioned means to permit unobstructed access to said cell through said filling well, a vent plug for closing the upper end of said filling well, an auxiliary gas vent tube adjacent said filling well having one end adapted to be closed by said vent plug and its opposite end terminating at the desired electrolyte level within said cell, and an overflow passageway connecting the space above the electrolyte and under said cover with the interior of said filling well in such a way that liquid flowing therethrough will fill said passageway to form a liquid seal to inhibit the escape of gases through said passageway during a filling operation whereby the closing of the lower end of said gas vent tube by the rise of liquid in said cell will cause the flow through said passageway to be retarded by the accumulation of gases under said cover and an indication to be given by the rise of liquid in said filling well, said overflow passageway serving as a gas vent for said cell when said vent plug is in position closing the upper end of said auxiliary vent.

4. In a cell employing liquid electrolyte a device for preventing overfilling of said cell comprising a filling well adapted to be supported in the cover for said cell so that the side walls thereof project above and below said cover, a disc in the lower end of said filling well having an opening therein substantially smaller than the diameter of the filling well so that the flow of fluid through the lower end of said filling well into said cell is retarded, a vent plug for closing the upper end of said filling well, a gas vent tube adjacent said filling well and having one end adapted to be closed by said vent plug and its opposite end terminating at the desired electrolyte level within said cell, and an overflow passageway connecting the space above the electrolyte in said cell with said filling well, said passageway extending upwardly and outwardly through the side wall of said filling well so that when liquid is flowing therethrough a liquid seal is provided whereby during a filling operation the closing of the lower end of said gas vent tube by the rise of liquid in said cell will cause the flow through said passageway to be retarded and an indication to be given by the rising of liquid in said filling well, said opening in said disc serving to drain said filling well at the termination of the filling operation whereby said passageway is drained to form a passageway for gases from the under side of said cover into said filling well and through said vent plug when said vent tube is closed by said vent plug in normal use of said cell.

5. In a cell employing liquid electrolyte a device for preventing overfilling of said cell comprising a cover, a filling well extending through said cover so that one end thereof lies above said cover and its opposite end projects below said cover, an orifice in the lower end of said filling well for restricting the flow of liquid into said cell at this point, a vent plug for closing the upper end of said filling well, an auxiliary vent tube adjacent said filling well and having an upper end adapted to be closed by said vent plug and its lower end projecting below said cover and terminating at the electrolyte level desired to be maintained, a fluid passageway of substantial area in the side wall of said filling well below said cover connecting said filling well with the space within said cell above the electrolyte level, the portion of said passageway communicating with said filling well lying at a lower level than the portion of said passageway communicating with said space above said electrolyte so that fluid flowing through said passageway forms a liquid seal preventing the escape of gases existing in said space above the electrolyte, whereby, during a filling operation liquid may be added to said cell until the level thereof reaches said lower end of said gas vent tube and further attempts to add liquid causes an increase of pressure of the gas confined in the space between the electrolyte level and the under side of the cover which increase in pressure retards the flow of fluid through said passageway causing the liquid in the filling well to raise to indicate completion of the filling operation, and whereby, upon termination of the filling operation liquid in the filling tube will be drained through said orifice and the liquid seal formed by said passageway will be broken to provide for venting of said cell during operation thereof with the vent plug in position to seal said auxiliary vent tube.

6. A device for preventing overfilling of a cell containing liquid electrolyte comprising a filling well adapted to extend into said cell and having a restricted opening adjacent its lowermost end, and air vent adjacent said filling well and having one end adapted to terminate at the desired electrolyte level in said cell, an overflow opening in the wall of said filling well and positioned so as to lie above said restricted opening but below said cover, said opening having an area greater than said restricted opening and having defining walls lying at an angle to said filling well so that liquid flowing through said filling well and said overflow opening will flow first downwardly and then upwardly to form a liquid seal at said overflow opening to prevent the escape of gas therethrough during a filling operation.

7. In a cell employing liquid electrolyte and having a cover, a device for preventing overfilling of said cell comprising a filling well adapted to be positioned in said cover and having walls adapted to project below said cover, means adjacent the lower end of said filling well for restricting the flow of liquid into the cell at this point, an air vent positioned adjacent said filling well and having one end terminating below said cover at the desired electrolyte level and its opposite end terminating adjacent the outer surface of said cover, and a slot in the wall of said filling opening adapted to lie intermediate the lower end of said filling well and the under side of said cover, said slot having an area greater than the area of the opening of said flow restricting means in said filling well and being cut at an angle so that liquid flowing therethrough will be deflected upwardly to form a liquid seal to prevent the escape of gas through said slot during a filling operation.

8. In a cell employing liquid electrolyte and having a cover, a device for preventing overfilling of said cell comprising a filling well adapted to be positioned in said cover and having walls adapted to project below said cover, means adjacent the lower end of said filling well for restricting the flow of liquid into the cell at this point, an air vent positioned adjacent said filling well and having one end terminating below said cover at the desired electrolyte level and its opposite end terminating adjacent the outer surface of said cover, an elongated slot in the wall of said filling opening above said flow restricting means and having an area greater than the area of the opening of said flow restricting means, and means for deflecting upwardly the liquid flowing through said slot whereby a liquid seal is formed and the escape of gas through said slot during a filling operation is prevented.

9. In a cell employing liquid electrolyte and having a cover, a device for preventing overfilling of said cell comprising a filling well adapted to be positioned in said cover and having walls adapted to project below said cover, means adjacent the lower end of said filling well for restricting the flow of liquid into the cell at this point, an air vent positioned adjacent said filling well and having one end terminating below said cover at the desired electrolyte level and its opposite end terminating adjacent the outer surface of said cover, an elongated slot in said filling well intermediate said flow restricting means and the under side of said cover, the inlet portion of said slot lying below the exit portion so that liquid flowing therethrough will be caused to flow upwardly to produce a liquid seal which prevents the escape of gases through said slot during a filling operation.

10. In a cell employing liquid electrolyte and having a cover, a device for preventing overfilling of said cell comprising a filling well depending from said cover and having a drain opening at the lower end thereof having an area substantially less than the area of said filling well, a main filling opening in the wall of said filling well intermediate the drain opening and the under side of said cover, said opening having an area substantially greater than said drain opening but being of such proportions that the flow of liquid therethrough forms a liquid seal to prevent the escape of gases during a filling operation, and a vent tube adjacent said filling well the lower end of which terminates at the desired electrolyte level in said cell and the upper end of which terminates adjacent the outer surface of said cover and is adapted to be closed when said filling well is closed, whereby during a filling operation filling liquid partially fills said filling well and overflows through said main filling opening until the lower end of said vent tube is covered by liquid whereupon back pressure under said cover retards the flow of liquid through said main filling opening and causes liquid to rise in said filling well to give an indication that said cell has been filled to the proper level and whereby after termination of the filling operation the liquid remaining in said filling well drains into said cell through said drain opening emptying said main filling opening to permit the venting of gases therethrough.

CLAIR DELMER OLSON.